Sept. 29, 1970 E. SCHÖNINGER 3,530,662

ELECTRICALLY CONTROLLED TIMEKEEPER DEVICES WITH MECHANICAL OSCILLATORS

Filed April 1, 1968 2 Sheets-Sheet 1

3,530,662
ELECTRICALLY CONTROLLED TIMEKEEPER DEVICES WITH MECHANICAL OSCILLATORS

Edgar Schöninger, Munich-Allach, Germany, assignor to Siemens Aktiengesellschaft, Munich, Germany, a corporation of Germany Filed Apr. 1, 1968, Ser. No. 717,572
Claims priority, application Germany, Apr. 19, 1967, S 109,401
Int. Cl. G04c 3/00
U.S. Cl. 58—23 12 Claims

ABSTRACT OF THE DISCLOSURE

A timekeeper device has a mechanical oscillator controlled without mechanical switching contacts by an excitation coil, which is movable in the field of a magnet and is joined with the mechanical oscillator. The coil is connected into the collector circuit of a driver transistor which, together with a control transistor, forms an astable multivibrator. The feedback connection between the collector circuit of the driver transistor and the base of the control transistor has two parallel branches of which one contains an ohmic resistor. The other branch contains a phase reversing member and an ohmic resistor in series with each other. The collector-emitter circuit of the control transistor extending between the direct-current supply buses of the multivibrator, contain ohmic resistors so as to form a voltage divider.

My invention relates to timekeeper devices of the type having a mechanical oscillator electrically controlled without mechanical switching contacts, the oscillator being part of a timepiece, such as the pendulum of a clock or the balance and hairspring assembly of a watch or chronometer.

More specifically my invention relates to timekeeper devices having a mechanical oscillator coupled with electromagnetic excitation means which comprises a field-magnet and an excitation coil located in the field of the magnet, the magnet or the coil, preferably the latter, being joined with the mechanical oscillator to move together therewith.

It is known to connect the excitation coil of such a timekeeper device into the output circuit of an astable multivibrator constituted by a network of a control transistor and a driver transistor, the transistors being complementary to each other, and a feedback connection extending from the collector of each transistor to the base of the other transistor.

In a known timekeeper device of the general type mentioned above, the excitation coil in the output circuit of the astable multivibrator is supplied with the energy required for maintaining the motion of the mechanical oscillator, and the electromotive force which such motion causes to be induced in the coil is utilized as a control signal for synchronizing the astable multivibrator. In this device, however, the control signal serves only to release the driving excitation pulse applied to the mechanical oscillator but does not take care of a proportional control of the pulse. The pulses issued are rather always of the same length and the same intensity independently of the pendulum or balance amplitude of the mechanical oscillator. Consequently the excitation pulses are strictly symmetrical to the oscillation zero point only at one given amplitude of oscillation.

Further known is an astable multivibrator network in which the control pulse is not only employed for synchronizing the multivibrator but also for effecting a true proportional control of the driving excitation pulses. In this device the astable multivibrator proper is supplemented by a bridge network in the circuit of the driver transistor, and the excitation coil forms part of this bridge network, whereas the input circuit of the control transistor is connected to the zero diagonal of the bridge. This device affords reclaiming the energy of the synchronizing control pulse normally overlapped by the driving excitation pulse.

However, it is a disadvantage of the latter device that the bridge branch to which one side, namely the emitter, of the control-transistor input circuit is connected, is traversed by part of the load current and thus entails an increased current consumption. On the other hand, a direct proportional regeneration or recapture of the control pulse is not strictly necessary but it suffices if the driver pulse is only partially filtered out.

It is an object of my invention to provide a timekeeper device with a mechanical oscillator electrically controlled without mechanical switching contacts, that obviates the disadvantages of the above-mentioned known systems of this type.

More specifically it is an object of my invention to provide a timekeeper device with an electrically controlled mechanical oscillator in which the magnetic system for exciting the oscillator is energized from a multivibrator whose driving pulse is subject to improved and substantially proportional control without appreciable increase in current consumption of the device, thus making it particularly well suitable for use with minature battery cells such as used in watches, for example.

To achieve these objects and in accordance with one of the features of my invention, a timekeeper device with a mechanical oscillator and an astable multivibrator network connected to the driver coil of the oscillator, has the feedback connection between the collector circuit of the driver transistor and the base of the control transistor split into two parallel branches of which one contains an ohmic resistor whereas the other branch comprises a phase reversing component and another ohmic resistor series-connected with each other. Preferably the ohmic resistors and the control-transistor base have a circuit point in common to which they may be connected either directly or through respective capacitors.

According to another feature of my invention, the above-mentioned objects are attained or more fully achieved by providing an ohmic voltage divider in the collector-emitter circuit of the control transistor between the positive and negative leads that supply energizing direct voltage to the multivibrator network in whose output circuit the excitational driver coil of the mechanical oscillator is connected. The voltage divider is constituted by at least one resistor in the collector circuit and at least one other resistor in the emitter circuit or by a resistance component in the collector circuit plus the resistive base-emitter circuit of the driver transistor.

The above-mentioned and other objects, advantages and features of my invention, said features being set forth with particularity in the claims annexed hereto, will be more fully described hereinafter with reference to the accompanying drawing illustrating by way of example four different embodiments of timekeeper devices according to the invention.

The same reference characters are applied in all of the illustrations for corresponding components respectively.

Figure 1:
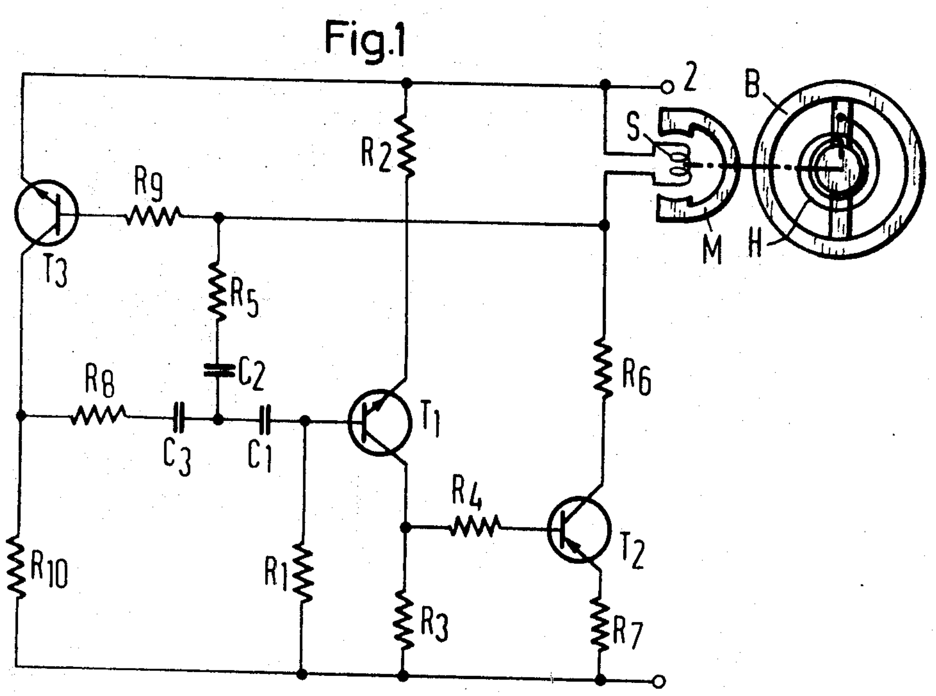
FIG. 1 shows schematiaclly a mechanical oscillator of the balance-and-spring type in conjunction with an electromagnetically excited driver system whose coil forms part of an astable multivibrator network.

FIG. 1 shows schematically at B a balance wheel with a hairspring H such as employed in watches and similar timepieces. Mounted on the rotationally oscillating balance B is the driver coil S of a magnetic system, the coil being movable between the respective north and south poles of a permanent magnet M and receives timed pulses for maintaining the oscillation of the mechancal oscillator. It will be understood that the particular oscillator represented in FIG. 1 is chosen by way of example only. Mechanical oscillators of other designs and types may be employed, for example a pendulum. Furthermore, the excitation coil may be stationary, and the permanent magnet or an electromagnet may be mounted on the movable structure of the oscillator.

The periodic excitation of the driver coil S is effected by means of an astable multivibrator constituted by the chain network of two complementary transistors $T_1$ and $T_2$ of which either one is of the pnp type and the other of the npn type. The transistor $T_1$ operates as the control transistor whereas the transistor $T_2$ constitutes the driver transistor. The coil S of the excitation system is connected in series with an ohmic resistor $R_6$ in the collector circuit of the driver transistor $T_2$. The emitter circuit of transistor $T_2$ contains another resistor $R_7$. The entire series connection of coil S, resistor $R_6$, the collector-emitter path of driver transistor $T_2$ and resistor $R_7$, is connected between the bus leads and terminals 1 and 2 of the battery voltage, the terminal 1 having a positive potential relative to terminal 2.

Resistors $R_2$ and $R_3$ are connected in the emitter circuit and collector circuit respectively of the control transistor $T_1$. These two resistors form together a voltage divider between the bus leads or terminals 1 and 2.

A feedback coupling extends from the coil S in the collector circuit of the driver transistor $T_1$ to the base of the control transistor $T_1$ and is split in two branches which are electrically parallel to each other. One of these branches contains an ohmic resistor $R_5$. The second branch contains a phase reversing member and another resistor $R_8$. In the present example the phase reversing member is constituted by a third transistor $T_3$, whose base is connected through a resistor $R_9$ in the second feedback branch and whose collector is shown connected with the above-mentioned resistor $R_8$ leading to the base of transistor $T_1$. The emitter of the phase-inverting transistor $T_3$ is connected with the negative bus lead 2. The emitter-collector path of the transistor $T_3$ thus is connected between the above-mentioned bus leads 1 and 2, a resistor $R_{10}$ being inserted between the collector and the bus 1.

Ignoring for the present the effect of the capacitors $C_1$, $C_2$, $C_3$ and of the voltage divider formed by resistors $R_2$ and $R_3$, the elimination of the disturbing effects of the driver pulse in this embodiment is substantially due to a summation occurring at the base of the control transistor $T_1$. The multivibrator is synchronized by the control pulse induced in coil S and passing through the resistor $R_5$. Consequently the control pulse causes the driver transistor $T_2$ to be switched on. An excessive control current would now tend to flow thorugh the resistor $R_5$ and would cause the above-mentioned disadvantageous results. However, the same control pulse also acts upon the base of the phase-inverting transistor $T_3$ and turns this transistor on. Transistor $T_3$ thus furnishes through the resistor $R_8$ a counterflow of current, namely a current whose polarity is opposed to that of the current flowing through the resistor $R_5$. This counter current obviates the tendency toward overcontrol of the control transistor $T_1$. In consequence the control pulse is approximately fully recaptured.

The insertion of the third transistor into the network of the illustrated type does not constitute a disadvantage in view of modern possibility and ease of providing integrated circuits for use in watches. Furthermore, no disadvantage is encountered as to current consumption since the remedial feature is incorporated into the control circuit rather than the load circuit of the multivibrator.

On the other hand, the invention affords considerable further advantages. If desired, the driver network need not be given any capacitor or lumped capacitance components and therefore may operate purely statically. To be sure, elimination of timing capacitance would also be adverse to self-starting, but this is often not required for electronically driven timepieces which can be started by mechanically starting the oscillator.

According to another feature of my invention, one of the resistors in the feedback connection from the driver transistor $T_2$ to the base of the control transistor $T_1$ may be designed as a thermistor thus attaining the additional advantage of an automatic temperature compensation of the timekeeper device.

According to still another feature of my invention and as also shown in FIG. 1, a capacitance member $C_1$ may be inserted between the circuit point 3 and the base of the control transistor $T_1$, so that relatively high ohmic transistors become applicable in the circuit of the feedback coupling. Upon such conditions considerably smaller reverse charging currents can flow through the capacitor $C_1$ and the coil S so that a detrimental effect of an isochronous oscillation can hardly occur.

According to still another feature of my invention, additional capacitors $C_2$ and $C_3$ may be provided between the respective resistors $R_5$ and $R_8$ and the circuit point 3, also shown in FIG. 1. This completely prevents a continuous flow of current through the paths S–$R_5$ and $R_8$–$R_{10}$. In addition, the compensation of the disturbing driver pulse is further improved and the self-starting optimalized.

Figure 2:
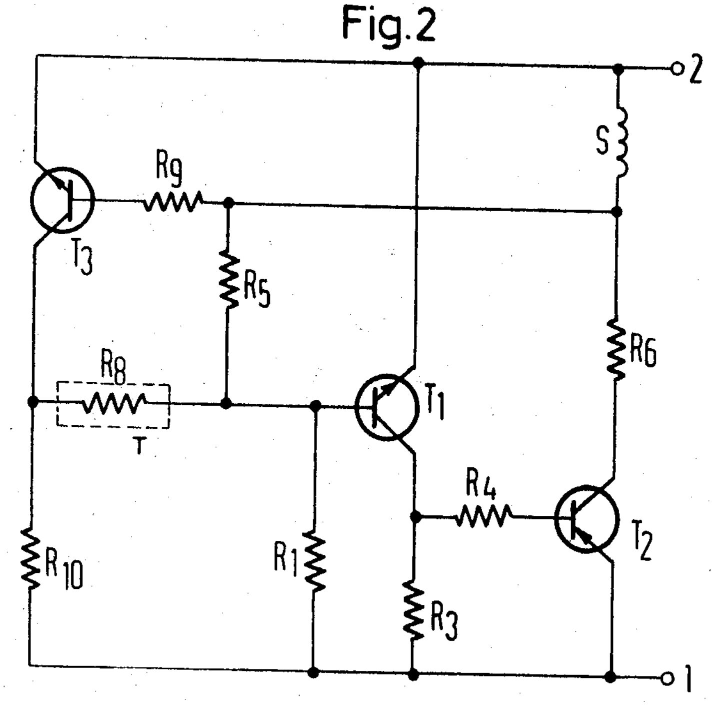
FIGS. 2, 3 and 4 illustrate three other embodiments of the multivibrator network, including the driver coil of the magnetic excitation system, the mechanical oscillator being otherwise not illustrated as it may correspond to the one shown in FIG. 1.
Figure 3:
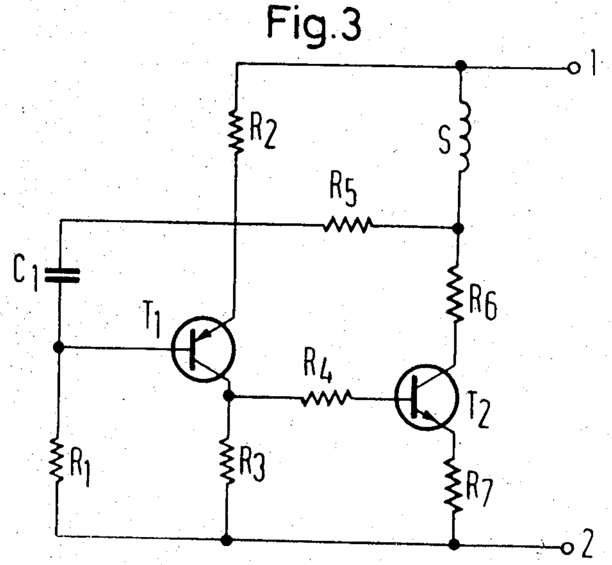
Figure 4:
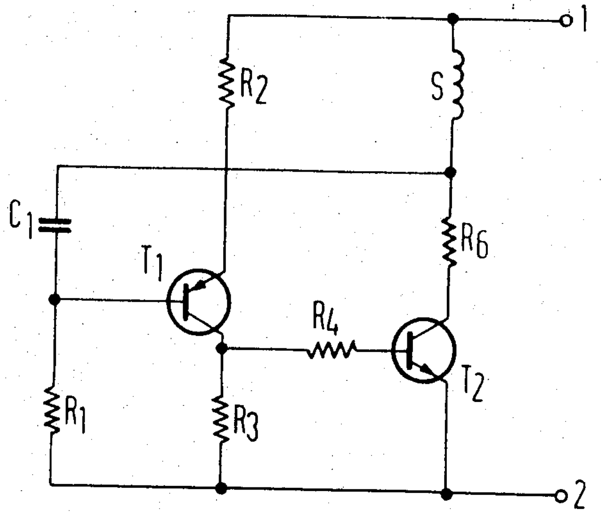

The embodiment of my invention illustrated in FIG. 1 and described in the foregoing is more elaborate than any of the other three embodiments to be described presently with reference to FIGS. 2, 3 and 4. It will be understood from the foregoing that some of the improvement features described are attainable without the provision of the voltage divider $R_2$–$R_3$ in the emitter-collector circuit of the control transistor $T_1$. It will further be understood from the foregoing that one or any of the capacitors $C_1$, $C_2$ and $C_3$ may be omitted. This is the case in the simplified embodiment of FIG. 2. The latter embodiment is not self-starting but in other respects secures the advantages explained in the foregoing with reference to FIG. 1.

The provision of a voltage divider in the emitter-collector circuit of the control transistor $T_1$ also affords, or contributes to, attaining the above-outlined objects of the invention. This will be more fully understood from the following description of the embodiment illustrated in FIG. 3.

As explained, the coil S shown in FIG. 3 (and FIG. 4) is the driver coil of the mechanical oscillator in a timekeeper device. As in the embodiments described above, the device further comprises an astable multivibrator constituted by a network of two transistors $T_1$ and $T_2$ of which the transistor $T_1$ is the control transistor and the transistor $T_2$ is the driver. The coil S is connected in the collector circuit of the driver transistor $T_2$ in series with a resistor $R_6$. The emitter-collector circuit of the driver transistor including the coil E extends between the bus leads and terminals 1 and 2 of the battery-voltage supply, it being assumed that the terminal 1 is positive with respect to the terminal 2. A feedback circuit connects driver coil S through a resistor $R_5$ and a capacitor $C_1$ to the base of the control transistor $T_1$ which is also connected to a resistor $R_1$ to the bus lead of terminal 2.

As explained, an ohmic voltage divider composed of resistors $R_2$ and $R_3$ is provided in the collector-emitter circuit of the control transistor $T_1$, the resistor $R_2$ being connected to the emitter and the resistor $R_3$ to the collector.

For understanding the performance of this network, it should be realized that at the moment when the driver pulse is being released, the collector voltage of the driver transistor $T_2$ jumps approximately by the amount of the battery voltage obtaining between the terminals 1 and 2. This full change in voltage is applied to the feedback capacitor $C_1$ and thus produces an overwhelmingly excessive overcontrol of the transistor $T_1$. Since the control pulse is always considerably smaller than the driver pulse, this performance cannot be looked upon as being a genuine control, since the driver pulse decays in accordance with a time constant determined by the RC-member $C_1/R_1$ and is wholly independent of the control pulse.

However, by virtue of the voltage divider in the collector-emitter circuit of the control transistor $T_1$, approximately the same voltage jump that appears at the collector of the driver transistor $T_2$ will also occur at the emitter of the control transistor $T_1$. Consequently the disturbing share of the driver pulse, which is superimposed upon the control pulse, becomes subtracted and thus is made ineffective as regards the control of the oscillator. Essentially only the control pulse remains effective between the base and the emitter of the control transistor $T_1$.

Since the voltage divider $R_2$–$R_3$ is not located in the output circuit but in the control circuit, this voltage divider can be made high ohmic so that a corresponding saving in battery curent will result. Use of the voltage divider feature in actual practices has shown that the dimensioning of the voltage divider also permits higher amounts of tolerances. With such a voltage-divider network in a timekeeper device for watches, there have been obtained approximately 30% lower driving currents and this also contributes to improved quality of the timing performance.

To make certain that the control pulses, during issurance of these pulses, are not short-circuited by the driver transistor, a resistor is preferably connected in the collector-emitter circuit of the driver transistor $T_2$. This function can be performed by the resistor $R_6$ in the collector circuit or by a resistor $R_7$ in the emitter circuit or by both resistors. If desired, however, one of these two resistors may be omitted.

The resistor $R_5$ in the feedback circuit between the driver coil S and the base of the control transistor $T_1$ may also be omitted in some cases. An embodiment corresponding to the simplifications just mentioned is illustrated in FIG. 4. Aside from the absence of resistors $R_7$ and $R_5$, the latter embodiment corresponds to that described above with reference to FIG. 3.

To those skilled in the art it will be obvious upon a study of this disclosure that my invention permits of various modifications and may be given embodiments other than particularly illustrated and described herein, without departing from the essential features of my invention.

I claim:

1. A timekeeper device, comprising a mechanical oscillator with electromagnetic excitation means having a field magnet and an excitation coil in the field of said magnet, said magnet being fixed and said excitation coil being movable and joined with said oscillator, an astable multivibrator network of a driver transistor and a control transistor complementary to said driver transistor, each of said transistors having a collector circuit and an emitter circuit and a base, said coil being connected in the collector circuit of said driver transistor, a first feedback connecting the collector circuit of said driver transistor to the base of said control transistor, a second feedback connecting the collector circuit of said control transistor to the base of said driver transistor, said first feedback comprising two parallel branches of which one has first ohmic resistance means connected to said control-transistor base, a phase reversing member and second ohmic resistance means being series-connected in said other branch.

2. In a timekeeper device according to claim 1, said first and second ohmic resistance means and the base of said control resistor having a circuit point in common.

3. In a timekeeper device according to claim 1, said one branch of said first feedback comprising a capacitor in series with said first ohmic resistance means.

4. In a timekeeper device according to claim 1, said phase reversing member being a third transistor having an emitter-collector path connected in series with said coil and having a base connected in said second branch of said first feedback.

5. In a timekeeper device according to claim 1, said first and second ohmic resistance means having a circuit point in common, a capacitor being connected between said point and the base of said control transistor.

6. A timekeeper device according to claim 1, comprising three capacitors serially connected respectively with each of said first and second ohmic resistance means and with the base of said control transistor, said three capacitors having a circuit point in common.

7. In a timekeeper device according to claim 1, at least one of said resistance means in said first feedback circuit being a thermistor.

8. In a timekeeper device according to claim 1, said one branch of said first feedback comprising a capacitor in series with said first ohmic resistance means, said network comprising two direct-voltage supply leads of different polarities, each of said transistors having said collector and emitter circuits extend serially between said two leads, and said collector and emitter circuits of said control transistor containing resistors which conjointly form a voltage divider.

9. A timekeeper device comprising a mechanical oscillator with electromagnetic excitation means having a field magnet and an excitation coil in the field of said magnet, said magnet being fixed and said excitation coil being movable and joined with said oscillator, an astable multivibrator network of a driver transistor and a control transistor complementary to said driver transistor, said network having two voltage supply leads, each of said transistors having a base and having respective emitter and collector circuits series-connected between said leads, said coil being connected between said leads in series with the emitter-collector circuits of said driver transistor, a first feedback connecting the collector circuit of said driver transistor to the base of said control transistor and containing a timing capacitor, a second feedback connecting the collector circuit of said control transistor to the base of said driver transistor, and an ohmic voltage divider forming part of the emitter-collector circuits of said control transistor between said leads said first feedback comprising two parallel branches of which one has first ohmic resistance means connected to said control-transistor base, a phase reversing member and second ohmic resistance means being series-connected in said other branch.

10. In a timekeeper device according to claim 9, said voltage divider comprising two resistors of which one is series-connected in the collector circuit of said control transistor, said other resistor being series-connected in the emitter circuit of said control transistor.

11. In a timekeeper device according to claim 9, said second feedback containing ohmic resistance means, said voltage divider comprising a resistor in the collector circuit of said control transistor and also comprising said second feedback in series with the emitter circuit of said driver transistor.

12. A timekeeper device, comprising a mechanical oscillator with electromagnetic excitation means having a fixed field magnet and an excitation coil movable in the field of said magnet and joined with said oscillator, an astable multivibrator network of a driver transistor and a control transistor of which each has a collector circuit and an emitter circuit and a base, said coil being connected in the collector circuit of said driver transistor, two direct-current supply buses of constant voltage, said transistors having said collector and emitter circuit serially connected between said two buses, the collector circuit of said control transistor being connected to the base of said driver transistor, and a feedback circuit extending from a variable-voltage point of said coil to the base of said control transistor and comprising two parallel branches of which one has first ohmic resistance means connected to said control-transistor base, and a phase reversing member and second ohmic resistance means series-connected in said other branch.

References Cited

UNITED STATES PATENTS 3,238,431 4/1968 Raval ---------------- 58—28

FOREIGN PATENTS 1,442,572 5/1966 France.

RICHARD B. WILKINSON, Primary Examiner

E. C. SIMMONS, Assistant Examiner

U.S. Cl. X.R.

58—28; 318—127